3,458,953
METHOD OF TREATING SOIL

Samuel F. Moses, 15259 Borda Road, La Mirada, Calif. 90638, Oscar L. Scherr, deceased, late of La Mirada, Calif., by Pearl B. Scherr, executrix, 14731 Calpella, La Mirada, Calif. 90638
No Drawing. Continuation-in-part of application Ser. No. 116,258, June 21, 1961. This application Mar. 24, 1965, Ser. No. 444,508
Int. Cl. A01n 7/02; A01g 25/00
U.S. Cl. 47—58                                              4 Claims

ABSTRACT OF THE DISCLOSURE

A method for treating soil to improve the water penetration, absorption, and retention properties thereof by adding to the soil an aqueous solution of an ethoxylated trimethyl heptanol.

---

This application is a continuation-in-part of application Ser. No. 116,258, filed June 21, 1961, now abandoned.

This invention relates to non-ionic surface active agents having a unique property of increasing the water penetration, absorption and retention properties of soils, and to a method for utilizing the same for such purposes.

The invention thus provides surface active agents (surfactants) which are useful for facilitating the irrigation of soil by water and which are adapted to be incorporated into water used for the irrigation of land for growing crops in arid soil. Water for irrigation purposes will be absorbed much more readily by the soil needing irrigation when an extemely small amount of one of the compounds of the invention has been added to the irrigation water. In addition, soils made very saline by irrigation water of high salt content and suitable only for limited crops may be desalted by use of the surfactants of this invention. Where it is desired to compact soil for road-building purposes, it has been found that adding a small amount of one of these unique surfactants to the soil greatly increases the speed and amount of compaction of the soil due to more rapid penetration and better distribution in the soil of the water added for compaction.

Further, we have found that the use of these surfactants on golf course greens and fairways greatly increases the penetration of water into the ground, thereby resulting in rapid absorption of water previously remaining on the surface in puddles unabsorbed by the ground for relatively long periods of time.

It is, therefore, an object of the invention to provide compositions of matter and a method of using the same for increasing water penetration and retention of soils.

A further object of the invention is to provide surface active compounds which provide exceptional soil wetting properties and which result in improved methods of irrigation, thereby greatly increasing the absorption of water by the soil being irrigated, and increasing the retention of such water in the soil.

A still further object of the invention is to provide certain surface active agents with unique soil wetting and penetrating properties for use in and to improve otherwise conventional processes for the compaction of soil, such as in road-building operations, and building construction.

These and other objects will be more readily understood from the following discussion.

The surfactants of the invention are trimethyl heptanols, or isomeric mixtures thereof such as those produced by the well known oxo process, with a certain limited polyoxyethylene content. The general method of preparation of these polyoxyethylene compounds is to react ethylene oxide with a mixture of isomeric trimethyl heptanols using conventional methods until ethoxylated derivatives having the desired number of moles of ethylene oxide per mole of heptanol are formed.

While ethoxylated derivatives of isomeric trimethyl heptanols having from one to twenty moles of ethylene oxide per mole of trimethyl heptanol all exhibit wetting agent or surfactant properties, it was found according to the invention that polyoxyethylene derivatives having from two to eight moles, preferably three to six moles, of ethylene oxide per mole of trimethyl heptanol were required for imparting to the soil significant increase in water absorption and retention characteristics, and for more effectively and uniformly distributing the water in the soil.

This is illustrated in numerous soil wetting tests of which the following is typical. A hard pan adobe clay soil of density 117.5 lb. per cu. ft. was reduced to pass through a No. 10 U.S. Standard Sieve. The material was then dried in an oven at 300° F. for three hours to insure that it was free of water. Glass tubes approximately one inch in diameter were filled to a depth of 5.5 inches with this soil. Plugs of glass wool served as supports and the soil was tamped to yield specimens of uniform density and a volume of 80 milliliters. Over each sample was then poured 40 milliliters of water containing three parts per million of the surfactant under test. Distilled water was used as a control. The time required for the water to penetrate the soil completely was noted and used as a measure of the speed of soil wetting. The water which passed completely through the soil was collected in beakers. After five hours the soil and water came to equilibrium as evidenced by the absence of any more water being lost from the soil. The amount of water lost was measured and the percentage of the water retained by the soil was calculated. The results are recorded in Table I along with the surface tension of the water solutions containing each of the surface active agents tested.

TABLE I.—SOIL WETTING AND WATER RETENTION
[Surfactant concentration equals 3 parts per million]

| Surfactant | Surface tension, dynes/cm. | Penetration time, minutes | Percent water retained |
|---|---|---|---|
| None (dist'd water) | 73 | 165 | 54 |
| Trimethyl heptanols plus 3.0 moles E.O.[1] | 59 | 150 | 68 |
| Trimethyl heptanols plus 4.5 moles E.O. | 57 | 110 | 81 |
| Trimethyl heptanols plus 6.0 moles E.O. | 61 | 150 | 65 |
| Isooctyl phenol plus 9.5 moles E.O. | 54 | 165 | 45 |
| Tridecanol plus 7.0 moles E.O. | 52 | 160 | 43 |
| Tridecanol plus 8.5 moles E.O. | 52 | 165 | 35 |
| Trimethyl hexanols plus 5.0 moles E.O. | 61 | 160 | 28 |

[1] E.O.=Ethylene oxide.

The results of Table I clearly demonstrate the superiority in water penetration of soil and its retention in soil treated with ethoxylated trimethyl heptanols compared to other wetting agents, even adjacent homologs. In particular optimum performance is reached when four to five moles of ethylene oxide have been added to the heptanols. These results are unusual in that they cannot be predicted from wetting power of the surfactant, e.g. the surface tension of their solutions, which is generally the criterion employed to predict wetting properties. In fact, at the concentrations used in these tests, the ethoxylated branched heptanols have a higher surface tension than most of the other surfactants tested. The extremely low concentrations of surfactant which are effective make the invention of particular importance when applying irrigation water to land. Effective concentrations of surfactant in water solution are from as low as one-half part per million (.00005%) to one thousand parts per million (0.1%), depending upon the particular application. For economy in irrigation use, lower concentrations of one to ten parts per million are preferred since these amounts are adequate for excellent results. In terms of treated area, such concentrations provide from about ⅓ to 3 gallons of active material per acre.

The improvements in conventional irrigation methods which flow from use of the surfactants of the invention are demonstrated by the following application conducted with the 5 mole (4.5) ethoxylate of mixed isomeric trimethyl heptanols.

The soil penetration power of the 5 mole ethoxylate was strikingly shown by adding small amounts to irrigation water used to irrigate a 15 acre plot of land planted with Thompson grapes at Indio, Calif. The soil of this particular plot of land was of a heavy gumbo type and full of various inorganic salts. In previous attempts at irrigation, various materials were added to the irrigation water to improve water penetration, such as gypsum, ammonium polysulfides, acid refining sludge, and other commercial wetting agents. None of these materials were able to achieve water penetration of the soil greater than three to three and a half feet at the most. Further, after the irrigation process was completed, the irrigation water remained in the irrigation ditches for five to seven days without being absorbed by the soil.

Irrigation of the same 15 acre plot of land was conducted using the same process as previously attempted, except that 30 gallons of a 50% water solution of the 5 mole ethoxylate were added to the irrigation water over a period of 24 hours at the rate of about 1.25 gallons per hour. The 50% water solution was added from a drum through a metered valve on top of the main water standpipe and injected into about 3.6 million gallons of irrigation water used in the irrigation process over a period of 24 hours, thereby spreading one gallon of the active material over one acre of land. The rate of flow of the irrigation water was about 150,000 gallons per hour over the 24 hour period, into the irrigation furrows of the plot of land.

To test for increased penetration of the soil by the irrigation water containing the 5 mole ethoxylate, holes were dug to a depth of seven feet at intervals throughout the 15 acres. Upon completion of the irrigation process, the test holes showed that the irrigation water containing the 5 mole ethoxylate had penetrated six to seven feet deep in the soil through the 15 acre plot of land. Further, the irrigation water collected in the irrigation furrows of the land was completely absorbed after a period of about four hours following irrigation.

Another important application of these new compounds is their use in methods of soil compaction in road-building. In this connection, the 5 mole ethoxylate of the isomeric trimethyl heptanols proved to be an indispensable factor in achieving satisfactory compaction of soil used in road-building, as the following indicates:

Specifications of the county of Los Angeles, California, required a minimum of 95% soil compaction of a fill for a road being built in the Canoga Park section of the city of Los Angeles. A conventional process for compacting the fill for the road was used in this case, which involved spreading four separate layers of diatomaceous earth, each layer being six inches higher, over an area of 6000 sq. ft. for the road. This area was two feet below the grade and had to be filled properly, and compacted properly for the road.

After each of the four layers of soil was spread, a gravity flow watering truck applied 2100 gallons of water per pass for each layer in three passes over each layer, spreading the water evenly over the 6000 sq. ft. area. After each application of water, the layer was compacted with a sheep foot tamper, a steel cylinder having many metal protuberances in the form of a sheep's foot projecting outwardly and perpendicular to the axis of the cylinder. When the cylinder is rotated over a layer by being pulled by a tractor, the protuberances tamp down the soil of the layer. In this case, the tamping was done for each of the four layers of fill in eight to ten passes each over the 6000 sq. ft. area.

After all four layers of fill were treated by the foregoing process, a compaction test of the fill was run to determine whether the soil compaction met the requirements of the county specification of a minimum of 95% compaction. The compaction test of the fill showed only 85% compaction, far below the minimum of 95% required. At this point, conventional procedure would be to remove the four layers of fill and repeat the entire process of compacting the fill in the hope of achieving the 95% minimum compaction of soil required.

Instead, the fill was watered evenly in three passes by the gravity flow watering truck with 2100 gallons of water, to which was added one half gallon of the 5 mole ethoxylate of the isomeric trimethyl heptanols for each 1000 gallons of water, making a water solution with a concentration of 0.05% by volume of the 5 mole ethoxylate. No other operations of any kind, such as tamping etc. were performed upon the fill after being watered with the 0.05% water solution of the 5 mole ethoxylate. The next day, compaction tests were run in the same manner as before and showed that the fill had a soil compaction of 96% after being treated with the water solution of the 5 mole ethoxylate, 1% more than the 95% compaction required.

Compaction tests are determined by comparing the treated soil with a standard curve obtained by adding given amounts of water to the untreated soil and subjecting the untreated soil to a drop hammer test. The untreated soil is first dried, and then a given amount of water is added. The soil mixture is placed in a calibrated cylinder and a standard plunger is dropped 30 times on the soil, after which the resulting volume of the soil is read. The resulting volume is considered to be the 100% compaction of the soil. In this way, compaction percentages are determined above and below 100% for the untreated soil, thereby creating a calibration curve.

To obtain the percent of compaction of the treated soil, a quantity of the treated soil, about four pounds, is removed from the fill and dried over a gas flame. The volume of the soil removed is ascertained by filling the space left after removal of the treated soil with a standard white glass sand of known weight. By determining the amount of sand needed to fill up the space left, the volume of the soil removed can be found. The dry weight of the treated soil for a given volume is used to determine the percent compaction on the calibration curve previously obtained.

For the purpose of comparing the activity of the trimethyl heptanol ethoxylate to a comercially available compacting agent, the same compacting process was run on an adjoining 6000 ft. area except that a 0.10% water solution was used of the commercial compacting agent. This compacting agent is known as Kompactor and consists of the acid sludge from oil refineries after treatment of petroleum with sulfuric acid in the refining process. The percent compaction achieved with Kompactor was only 92%, which failed to meet the minimum requirement of 95% compaction.

Another application of the compounds of the invention involves watering of golf courses, both greens and fairways. We have found that adding a small amount of one of the trimethyl heptanol ethoxylates to water used to spray golf courses greatly increases water penetration of the ground.

The increase in water penetration was demonstrated on a golf course fairway where core samples taken with a soil auger from various portions of the fairway showed wet soil down to only one half to one inch in depth. Due to this poor water penetration, puddles would remain on the fairway for several days after watering.

This fairway had an area 200 yards long and 25 yards wide. It was sprayed with 1000 gallons of 0.025% water solution of the 5 (4.5) mole ethoxylate of the isomeric trimethyl heptanols. This solution was sprayed uniformly over the area of the fairway at a rate of 90 gallons per minute until the 1000 gallons was used up. The next day, core samples taken from the fairway showed wet soil down to a depth of 6 to 8.8 inches in various portions of the fairway. No puddles remained anywhere on the fairway after the spraying was completed, even on portions of the fairway where puddles would usually remain after the customary watering of the fairway.

Equally good results were obtained by a similar treatment given to a green of a golf course where core samples of the green before treatment showed water penetration only down to one eighth of an inch of the ground of the green. After treatment similar to the golf fairway with a 0.025% water solution of the 5 mole ethoxylate, core samples taken from the green on the day after treatment showed water penetration down to four and one half inches of the ground of this green.

The efficiency of a 4.5 mole ethoxylate of trimethyl heptanol was also demonstrated by a series of tests on plots of land laid out in Santa Fe Springs, California. An area of land of approximately 0.25 acre was laid out and all loose dirt removed from the surface so that a hard level surface of adobe clay was exposed. Square test plots 4 ft. x 4 ft. were laid out and spaced 20 ft. from each other. Using a strip of metal lawn edging, a dam was erected around the edge of each strip so that the surface of the plot could be flooded with water. The dam extended to a depth of approximately six inches into the ground. To each area was then applied 120 gallons of water in four 30 gallon applications. This amount of water is the equivalent of applying one foot of water to the surface. The various surfactants were employed in one set of tests at a concentration of three parts per million. Water was used as a control. Twenty-four hours after the water had disappeared, cores were removed from each plot, and the depth of water penetration was measured. In addition the water content of the soil was determined on cores taken from various depths to determine the uniformity of water distribution throughout the soil. Results are tabulated in Table II.

The results as tabulated in Table II clearly demonstrates the greater depth of soil penetration and the better water retention and distribution that is achieved when using the 4.5 mole ethoxylate of trimethyl heptanols as the surfactant.

TABLE II.—SOIL WETTING TESTS ON LAND PLOTS
[Surfactant concentration equals 3 parts per million]

| Surfactant | A | B | C | D | None |
|---|---|---|---|---|---|
| Depth (inches) of water penetration, 24 hours | 25 | 30 | 25 | 24 | 22 |
| Percent water in soil at— | | | | | |
| 6 inches | 14.2 | 13.8 | 13.9 | 14.0 | 15.1 |
| 18 inches | 11.8 | 14.8 | 12.2 | 11.8 | 12.2 |
| 30 inches | Nil | 11.6 | Nil | Nil | Nil |
| Percent water in soil one week later at— | | | | | |
| 6 inches | 9.0 | 12.1 | 10.1 | 11.1 | 11.1 |
| 18 inches | 10.3 | 10.8 | 10.5 | 11.5 | 10.5 |
| 30 inches | Nil | 10.9 | Nil | Nil | Nil |

A=Tridecanol condensed with 8.5 moles ethylene oxide; B=Trimethyl heptanol, 4.5 moles ethoxylate; C=Trimethyl hexanol, 4.5 moles ethoxylate; D=Isoctyl phenol, 9.5 moles ethoxylate, commercial Triton X-100.

The following are typical examples for the preparation of the heptanols of the invention.

Example I 790 grams (5 moles) of isomeric trimethyl heptanols produced by the oxo process and 2 grams of sodium hydroxide pellets were charged into a suitable autoclave, agitated, and purged of air with nitrogen gas. The mixture was heated to a temperature of 145° C., and then 880 grams (20.0 moles) of ethylene oxide were added at a rate such that the maximum pressure did not exceed 175 p.s.i. and that the maximum temperature did not exceed 200° C. After about an hour and a half, the reaction mixture was cooled to a temperature of 85° C., and then 3 grams of glacial acetic acid were added.

The resulting product is a clear, colorless liquid at room temperature and is the calculated 4 mole ethoxylate of the isomeric trimethyl heptanols.

Example II

The process of Example I is repeated except for differences in the amount of certain reactants. Instead of the amounts stated therein as to the following reactants, 1100 grams (25 moles) of ethylene oxide and 2.27 grams of sodium hydroxide pellets were used along with 3.4 grams of glacial acetic acid.

The resulting product is a clear, colorless liquid at room temperature and is the calculated 5 mole ethoxylate of the isomeric trimethyl heptanols.

Example III

The process of Example I is repeated except for differences in the amount of the reactants. In Example III, the autoclave was charged with 711 grams (4.5 moles) of isomeric trimethyl heptanols and 5 grams of sodium hydroxide pellets. 1182 grams (26.86 moles) of ethylene oxide were added followed by 8 grams of glacial acetic acid.

The resulting product is a clear, colorless liquid which becomes a semi-solid mass at room temperature and is the calculated 6 mole ethoxylate of the isomeric trimethyl heptanols.

While the foregoing specification describes certain applications and examples of the invention in some detail, it is understood that the scope thereof is not limited thereby and that numerous variations are possible without departing from the spirit and scope of the invention as claimed hereinafter.

We claim:
1. A process for treating soil to improve the penetration, absorption, and retention of water applied thereto, which comprises subjecting the soil to the action of an aqueous solution of a non-ionic surfactant consisting essentially of an ethoxylated trimethyl heptanol having from 2 to 8 moles of ethylene oxide per mole of heptanol.

2. The process of claim 1 wherein the surfactant is a mixture of ethoxylated isomeric trimethyl heptanols containing from 4 to 5 moles of ethylene oxide per mole of heptanol.

3. The process of claim 1 wherein the ethoxylated trimethyl heptanol is added to the soil to provide a concentration of from about one-half (0.5) to one thousand (1000) parts per million of water in contact with the soil.

4. The process of claim 2 wherein the ethoxylated isomeric trimethyl heptanols are added to irrigation water to provide a concentration of from about one (1) to one hundred (100) parts per million.

References Cited

UNITED STATES PATENTS 3,099,107  7/1963  Trimble _____ 71—2.7
3,111,999  11/1963  Lummus et al. _____ 260—615 B

FOREIGN PATENTS 584,534  10/1959  Canada.
719,445  12/1954  Great Britain.

JAMES O. THOMAS, Jr., Primary Examiner

U.S. Cl. X.R.

61—36; 71—122